(12) United States Patent
Moravec et al.

(10) Patent No.: US 9,689,658 B2
(45) Date of Patent: Jun. 27, 2017

(54) METHOD FOR DETECTING CHANGES OF POSITION OF SHAFTLESS SPINNING ROTOR OF OPEN-END SPINNING MACHINE IN CAVITY OF ACTIVE MAGNETIC BEARING AND SPINNING UNIT OF OPEN-END SPINNING MACHINE WITH ACTIVE MAGNETIC BEARING FOR BEARING SHAFTLESS SPINNING ROTOR

(71) Applicants: Milan Moravec, Usti nad Orlici (CZ); Miroslav Stusak, Chocen (CZ); Jiri Sloupensky, Chocen (CZ)

(72) Inventors: Milan Moravec, Usti nad Orlici (CZ); Miroslav Stusak, Chocen (CZ); Jiri Sloupensky, Chocen (CZ)

(73) Assignee: RIETER CZ S.R.O. (CZ)

( * ) Notice: Subject to any disclaimer, the term of this patent is extended or adjusted under 35 U.S.C. 154(b) by 0 days.

(21) Appl. No.: 14/200,305

(22) Filed: Mar. 7, 2014

(65) Prior Publication Data
US 2014/0285185 A1    Sep. 25, 2014

(30) Foreign Application Priority Data
Mar. 22, 2013  (CZ) ............................. PV 2013-209

(51) Int. Cl.
*G01B 7/14*  (2006.01)
*D01H 4/12*  (2006.01)
(Continued)

(52) U.S. Cl.
CPC ............ *G01B 7/14* (2013.01); *D01H 4/12* (2013.01); *D01H 4/44* (2013.01); *F16C 32/0446* (2013.01);
(Continued)

(58) Field of Classification Search
CPC .. D01H 4/00; D01H 4/12; D01H 4/44; H02K 7/09; H02K 7/08; H02K 7/085;
(Continued)

(56) References Cited

U.S. PATENT DOCUMENTS 4,483,570 A * 11/1984 Inoue ..................... B64G 1/32
244/158.1
4,652,780 A *  3/1987 Murakami et al. ......... 310/90.5
(Continued)

FOREIGN PATENT DOCUMENTS

CZ           297 426        12/2006
CZ           298 507        10/2007
(Continued)

OTHER PUBLICATIONS

Search Report dated Jul. 23, 2014 issued in corresponding European Patent Application No. EP 14 15 8476.
(Continued)

*Primary Examiner* — Arleen M Vazquez
*Assistant Examiner* — Steven Yeninas
(74) *Attorney, Agent, or Firm* — Ostrolenk Faber LLP

(57) ABSTRACT

A spinning unit and method for detecting changes of position of a shaftless spinning rotor (1) of an open-end spinning machine in a cavity of an active magnetic bearing, in which the position of the spinning rotor (1) is detected by a system of sensors (A, B) and on basis of the detected changes in the position of the spinning rotor (1) is adjusted controlling of the active magnetic bearing in order to eliminate undesirable changes in the position of the spinning rotor (1) in the cavity of the active magnetic bearing. Continuously is detected radial shifting of the spinning rotor (1) and simultaneously is continuously detected inclination of the spinning rotor (1), whereupon according to the detected changes in the position of the spinning rotor (1) is determined shifting and/or
(Continued)

inclination of the spinning rotor (1) which is used for subsequent adjustment of the controlling of position of the spinning rotor (1) in the active magnetic bearing, wherein both radial shifting and inclination of the spinning rotor are each detected by at least two pairs of sensors of the distance of monitored surface of the spinning rotor, the pairs of sensors for detecting radial shifting of the spinning rotor detect changes of distances of the cylindrical wall of the spinning rotor from the sensors. The sensors (A, B) of the position of the spinning rotor (1) are grouped into pairs, whereby two pairs of sensors (A1, A2) for detecting of radial shifting of the spinning rotor (1) are arranged on the opposite sides of the spinning rotor (1) against the cylindrical wall (10) of the spinning rotor (1) and at the same time another two pairs of sensors (B1, B2) for detecting of inclination of the spinning rotor (1) are arranged on the opposite sides of the spinning rotor (1) against the wall (11) of the spinning rotor (1), which is perpendicular to the rotation axis (OA) of the spinning rotor (1).

9 Claims, 3 Drawing Sheets

(51) Int. Cl.
*F16C 32/04* (2006.01)
*D01H 4/44* (2006.01)
(52) U.S. Cl.
CPC ...... *F16C 32/0451* (2013.01); *F16C 2340/18* (2013.01)
(58) Field of Classification Search
CPC .......... H02K 7/086; H02K 7/088; G01B 7/14; G01B 7/30; G01B 7/003; G01B 7/02; G01B 7/023; G01B 7/144; F16C 32/04; F16C 32/0406; F16C 32/044; F16C 32/0446; F16C 32/0448; F16C 32/0485; F16C 32/0487; F16C 32/0489; F16C 32/0491; F16C 32/0451; F16C 2340/18
USPC .............. 57/400, 404, 406, 407; 324/207.23, 324/207.25, 207.2, 207.22, 207.24, 324/207.26, 207.11–207.19; 310/68, 310/90.5, 90, 12.19, 91; 340/382
See application file for complete search history.

(56) References Cited

U.S. PATENT DOCUMENTS

| | | | | |
|---|---|---|---|---|
| 4,732,353 A * | 3/1988 | Studer | ...................... | B64G 1/28 244/165 |
| 5,155,402 A * | 10/1992 | Bichler | ............... | F16C 32/0453 310/90.5 |
| 5,313,399 A * | 5/1994 | Beale | ............................ | 701/124 |
| 5,530,306 A * | 6/1996 | Ueyama | ....................... | 310/90.5 |
| 5,535,582 A * | 7/1996 | Paweletz | ........................ | 57/414 |
| 5,570,572 A * | 11/1996 | Birkenmaier et al. | .......... | 57/406 |
| 5,686,772 A * | 11/1997 | Delamare et al. | ............ | 310/90.5 |
| 5,763,972 A * | 6/1998 | Bernus | ................ | F16C 32/0446 310/152 |
| 6,057,681 A * | 5/2000 | Kipp et al. | .................. | 324/207.2 |
| 6,710,489 B1 * | 3/2004 | Gabrys | ........................ | 310/90.5 |
| 7,197,958 B2 * | 4/2007 | Brault et al. | ................. | 74/572.2 |
| 2002/0047404 A1* | 4/2002 | Coenen | ........................ | 310/90.5 |
| 2003/0141773 A1* | 7/2003 | Abel | ............................. | 310/90.5 |
| 2004/0174080 A1* | 9/2004 | Beyer | ................... | F16C 32/044 310/90.5 |
| 2009/0308285 A1* | 12/2009 | Bode | .................. | B23Q 11/0032 108/22 |

FOREIGN PATENT DOCUMENTS

| | | |
|---|---|---|
| CZ | 300 225 | 3/2009 |
| CZ | 300 226 | 3/2009 |
| DE | 10 2004 029 020 A1 | 12/2005 |
| EP | 1 170 408 A1 | 1/2002 |
| EP | 1 939 473 A1 | 7/2008 |
| JP | 3-255240 | 11/1991 |
| JP | 8-105441 | 4/1996 |
| JP | 9-42291 | 2/1997 |
| WO | WO 2008/000335 A1 | 1/2008 |

OTHER PUBLICATIONS

Search Report dated Dec. 12, 2013 issued in corresponding Czech Republic Patent Application No. PV 2013-209.

* cited by examiner

METHOD FOR DETECTING CHANGES OF POSITION OF SHAFTLESS SPINNING ROTOR OF OPEN-END SPINNING MACHINE IN CAVITY OF ACTIVE MAGNETIC BEARING AND SPINNING UNIT OF OPEN-END SPINNING MACHINE WITH ACTIVE MAGNETIC BEARING FOR BEARING SHAFTLESS SPINNING ROTOR

TECHNICAL FIELD

The invention relates to a method for detecting changes of position of a shaftless spinning rotor of an open-end spinning machine in a cavity of an active magnetic bearing, in which the position of the spinning rotor is detected by a system of sensors and on basis of the detected changes in the position of the spinning rotor is adjusted controlling of the active magnetic bearing in order to eliminate undesirable changes in the position of the spinning rotor in the cavity of the active magnetic bearing.

The invention also relates to a spinning unit of an open-end spinning machine with an active magnetic bearing for bearing a shaftless spinning rotor which comprises means for creating and controlling of a magnetic field, in which the spinning rotor is arranged, whereby the bearing further comprises sensors of the position of the spinning rotor, the sensors are coupled with detectors of their output signals and are coupled with evaluation circuits and the evaluation circuits is connected to the control system of the active magnetic bearing.

BACKGROUND OF THE INVENTION

For the purpose of bearing very fast-rotating shaftless spinning rotors of open-end spinning machines there are special devices which by means of controlled magnetic forces ensure the position as well as the drive of the spinning rotor. Such devices are generally known as active magnetic bearings.

So as to guarantee proper functioning of the active magnetic bearing, it is essential to know the instantaneous position of the spinning rotor in the magnetic field in the active magnetic bearing and also possible changes of this position over time in a three-dimensional rectangular coordinate system with the axes x, y, z. The spinning rotor must be maintained in the required position by the regulatory (control) system on the basis of continuously detected and assessed data about its position, also in order to avoid an accident of the spinning rotor caused by the influence of a possible excessive deflection of the spinning rotor which would lead to all the negative effects following especially from the high speed of the rotation of the spinning rotor, e.g. an accident due to the contact of the spinning rotor with the other parts of the active magnetic bearing.

In the active magnetic bearings in which the height of the spinning rotor approximates the diameter of the spinning rotor there is a problem of correctly recognizing particularly the so-called oscillations of the spinning rotor during its rotation, i.e. variations of the actual rotation axis of the spinning rotor in relation to the theoretical rotation axis of the spinning rotor. The spinning rotor is maintained in a direction of its rotation axis in a required position by the action of the magnetic forces and permanent magnets of the active magnetic bearing, and so possible shifting of the spinning rotor in a direction of the rotation axis of the spinning rotor is corrected completely automatically by the action of these permanent magnets. Up to now in this simple arrangement basically merely radial shifting of the rotation axis of the rotor is detected by appropriately disposed sensors of the spinning rotor, which in essence work on the principle of detecting changes of distance of the monitored area of the spinning rotor from the sensors and subsequently according to these changes correction of the levitation of the spinning rotor is carried out.

Therefore conventional sensors of the spinning rotor usually work in pair arrangement, i.e. in pairs, whereby all the pairs are disposed in one plane along the circumference area of the spinning rotor, where they are capable of detecting radial shifting of the spinning rotor in relation to the theoretical rotation axis. However, in this disposition they are not capable of identifying reliably changes of the position of the spinning rotor caused by the oscillations of the spinning rotor, whereby these possible oscillations are not corrected spontaneously by the action of the magnetic forces of the permanent magnets of the active magnetic bearing.

For the purpose of detecting the oscillations of the rotor, it is possible to apply an arrangement of sensors of the spinning rotor in two parallel sensing planes against the outer circumference of the spinning rotor, i.e. against its cylindrical area. However, this solution is costly and requires additional space for a second, parallel system of sensors, detectors and evaluation circuits. Furthermore, due to the small length of shaftless spinning rotors and due to generally relatively small spinning units with active magnetic bearings in open-end spinning machines, this necessary additional space is not available without a substantial increase in the length of shaftless spinning rotors as well as in the external dimensions of the spinning units.

The goal of the invention is to eliminate or at least reduce the shortcomings of the background art, particularly to improve possibilities of detecting the position of a shaftless spinning rotor in a spinning unit of an open-end spinning machine.

SUMMARY OF THE INVENTION

The aim of the invention is achieved by a method for detecting changes of position of a shaftless spinning rotor of an open-end spinning machine in a cavity of an active magnetic bearing, whose principle consists in that continuously is detected radial shifting of the spinning rotor and simultaneously is continuously detected inclination of the spinning rotor, whereupon according to the detected changes in the position of the spinning rotor is determined shifting and/or inclination of the spinning rotor which is used for subsequent adjustment of the controlling of position of the spinning rotor in the active magnetic bearing.

The aim of the invention is also achieved by a spinning unit of an open-end spinning machine with an active magnetic bearing for bearing a shaftless spinning rotor, whose principle consists in that spinning unit of an open-end spinning machine with an active magnetic bearing for bearing a shaftless spinning rotor which comprises means for creating and controlling of a magnetic field, in which the spinning rotor is arranged, whereby the bearing further comprises sensors of the position of the spinning rotor, the sensors are coupled with detectors of their output signals and are coupled with evaluation circuits and the evaluation circuits is connected to the control system of the active magnetic bearing.

The advantage of this solution in comparison to the background art is a better detection of the position of the spinning rotor during its rotation in the active magnetic bearing of the spinning unit of an open-end spinning machine. The process of detecting all this is performed sufficiently quickly and with required accuracy and reliability of the measurement results

BRIEF DESCRIPTION OF THE DRAWINGS

The invention is schematically represented in the drawings, where.

DESCRIPTION OF EMBODIMENTS

The invention will become more apparent from the following description of an example of embodiment of an active magnetic bearing with a shaftless spinning rotor for a spinning unit of an open-end spinning machine.

An open-end spinning machine comprises at least one row of operating units situated next to each other. Each operating unit comprises, apart from a number of other components, also a spinning unit, in which is arranged an active magnetic bearing, in which a shaftless spinning rotor 1 is rotatably mounted. The active magnetic bearing ensures maintaining the position of the spinning rotor 1 in relation to the other parts of the spinning unit by means of a controlled magnetic stabilization system 13. The drive of the spinning rotor 1 is ensured by means of a controlled electromagnetic driving system 12.

Under the position of the spinning rotor 1 we understand positioning the spinning rotor 1 in a three-dimensional coordinate system, i.e. including the current rotation axis OA of the spinning rotor 1, i.e. the actual rotation axis of the spinning rotor 1, in relation to the theoretical rotation axis OI of the spinning rotor 1, the theoretical rotation axis OI of the spinning rotor 1 being determined from the geometry of the active magnetic bearing, of the spinning unit and of the spinning rotor 1.

Figure 2:
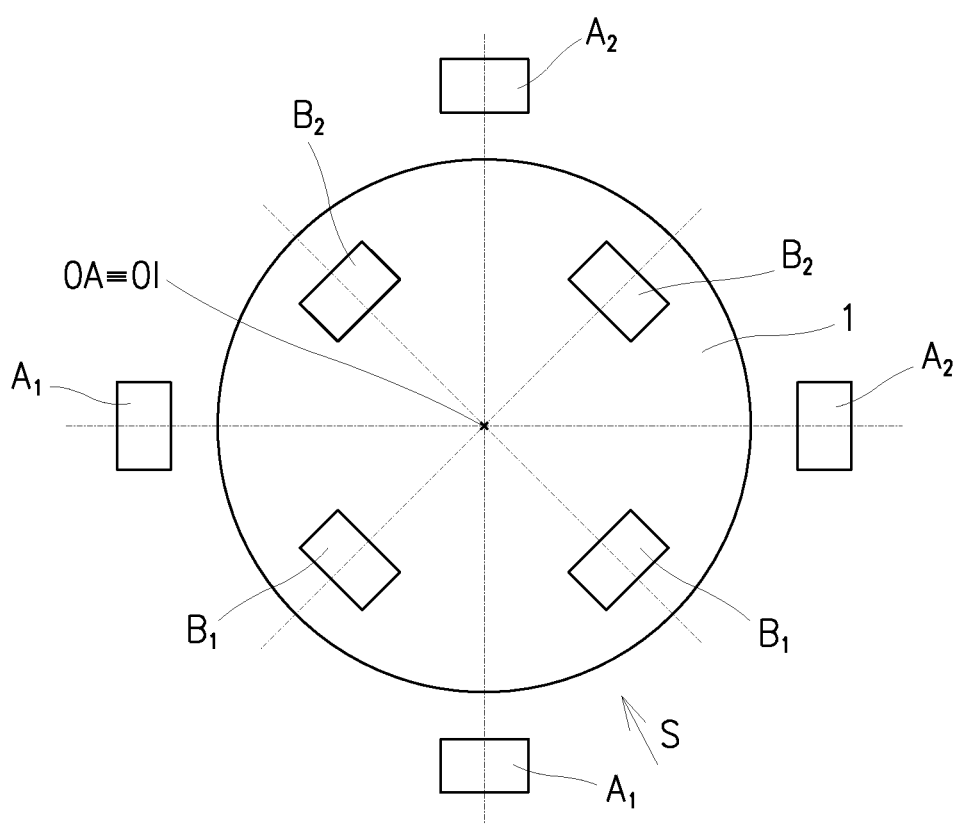
FIG. 2 shows an example of embodiment of arrangement of the sensors of the spinning rotor.

The position of the current rotation axis OA is detected by the system of detecting the position of the spinning rotor 1 in the active magnetic bearing. The system of detecting the position of the spinning rotor comprises sensors A for detecting radial shifting of the spinning rotor 1 and sensors B for detecting inclination of the spinning rotor 1. The sensors A of the position of the spinning rotor 1 as well as the sensors B of the position of the spinning rotor 1, are coupled with detectors D of their output signals and also with evaluation circuits and the control device of the active magnetic bearing, as is shown in FIG. 2.

For the purpose of detecting radial shifting of the spinning rotor 1 as well as for detecting inclination of the spinning rotor 1, it is theoretically necessary to use at least three sensors A for detecting radial shifting of the spinning rotor 1 and three sensors B for detecting inclination of the spinning rotor 1. In the illustrated examples of embodiment the sensors A, B of the position of the spinning rotor 1 are always arranged in two pairs, i.e. two pairs of sensors A1, A2 for detecting radial shifting of the spinning rotor 1 and two pairs of sensors B1, B2 for detecting inclination of the spinning rotor 1, as is apparent from FIGS. 2 to 4 and as will be described below.

The pairs of sensors A1, A2 for detecting radial shifting of the spinning rotor 1 are arranged on the opposite sides of the spinning rotor 1 against the cylindrical wall 10 of the spinning rotor 1. The pairs of sensors B1, B2 for detecting inclination of the spinning rotor 1 are arranged on the opposite sides of the spinning rotor 1 against the wall 11 of the spinning rotor 1, which is perpendicular to the rotation axis OA of the spinning rotor 1. The expression "on the opposite sides" in the preceding sentence means that the sensors B are located in relation to the corresponding wall 11 of the spinning rotor 1 symmetrically to the rotation axis OA of the spinning rotor 1, as is also shown in the drawings. The wall 11 of the spinning rotor 1, which is perpendicular to the rotation axis OA of the spinning rotor 1, is e.g. the bottom of the spinning rotor 1 or another suitably oriented wall of the spinning rotor 1.

Figure 1:
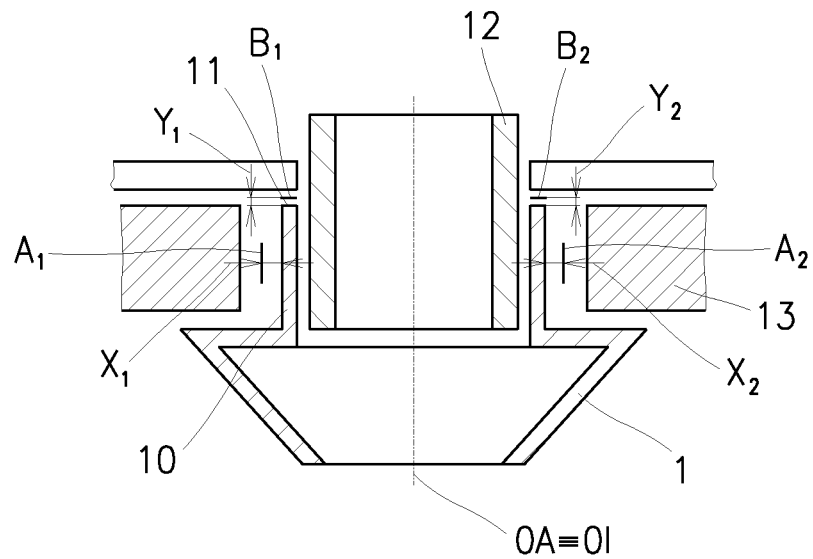
FIG. 1 shows an example of arrangement of sensors of a spinning rotor in an active magnetic bearing.
Figure 3:
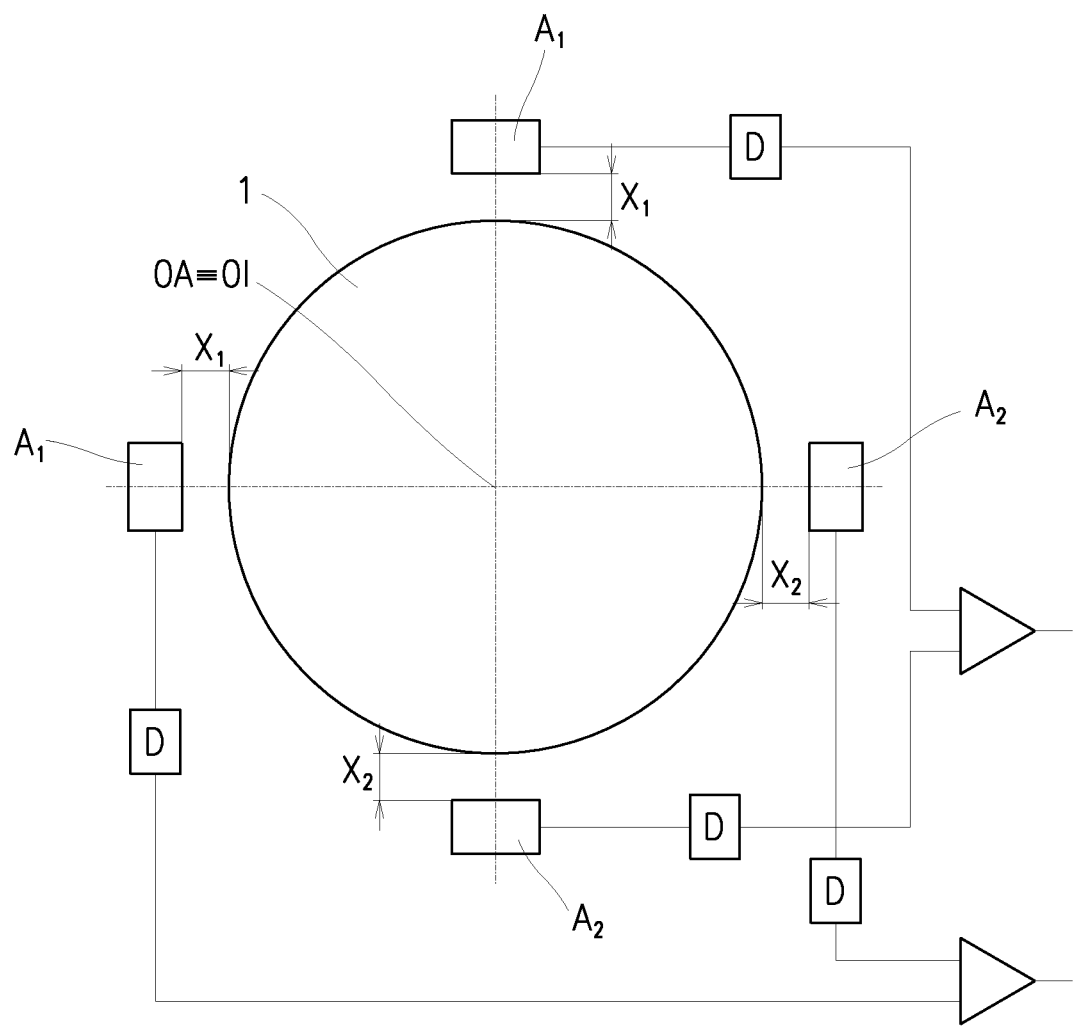
FIG. 3 represents an arrangement of sensors for detecting radial shifting of the spinning rotor and the distances from the cylindrical wall of the spinning rotor measured by them and FIG. 4 shows an arrangement of sensors for detecting inclination of the spinning rotor and the distances from the wall of the spinning rotor measured by them, the wall being perpendicular to the rotation axis of the spinning rotor, all shown in the perspective in a direction S from FIG. 2.

The pairs of sensors A1, A2 for detecting radial shifting of the spinning rotor 1 detect changes of distances X1, X2 of the cylindrical wall 10 of the spinning rotor 1 from the sensors A1, A2, as is shown in FIGS. 1 and 3. The pairs of sensors B1, B2 for detecting inclination of the spinning rotor 1 detect a change of the distances Y1, Y2 of the wall 11 of the spinning rotor 1, which is perpendicular to the rotation axis OA of the spinning rotor 1, from the sensors B1, B2, as is apparent from FIG. 1 a 4.

In an advantageous embodiment, two pairs of sensors A1, A2 are disposed along the circumference of the spinning rotor 1 in two directions perpendicular to each other, as is shown in FIG. 2.

In a preferred embodiment there are two pairs of sensors B1, B2 located in two directions which are perpendicular to each other and which are, as the case may be, turned against the placement of the sensors A by an angle of 45°.

In the embodiment in FIG. 1 a pair of sensors A is shown for detecting radial shifting of the spinning rotor 1, i.e. the sensors A1 and A2, and at the same time a pair of sensors B is illustrated for detecting inclination of the spinning rotor 1, i.e. the sensors B1 and B2.

The sensors A1, A2, B1, B2 detect the distances X1, X2, Y1, Y2 of the spinning rotor 1 from a respective sensor A1, A2, B1, B2, or they detect changes of these distances X1, X2, Y1, Y2. In this arrangement, it is relatively easy to determine the type of change of the position of the spinning rotor 1 in relation to the theoretical position, or the type of change of the position of the current rotation axis OA of the spinning rotor 1 in relation to the theoretical rotation axis OI of the spinning rotor 1, using decision logic, which is described below. According to the detected type of change of the position of the rotating spinning rotor 1 as well as according to the detected size of the change of the position of spinning rotor 1, appropriate measures are taken in the process of controlling the active magnetic bearing which ensure that the spinning rotor 1 returns to its theoretical position, i.e. to a match between the axes OI and OA. In this manner the position of the spinning rotor 1 rotating in the magnetic field of the active magnetic bearing is monitored and maintained in the axes x, y, z of a rectangular coordinate system.

Decision logic for determining the type of change of the position of the spinning rotor 1 in relation to its theoretical position is for the embodiment shown in FIG. 1 such that if it holds that:

a) x1=x2 AND y1=y2—spinning rotor 1 is in the theoretical position, in which his current rotation axis OA is identical with the theoretical rotation axis OI, b) x1>x2 AND y1=y2—radial shifting of the spinning rotor 1 to the right occurred c) x1<x2 AND y1=y2—radial shifting of the spinning rotor 1 to the left occurred d) x1<x2 AND y1>y2—inclination of the spinning rotor 1 to the right occurred e) x1>x2 AND y1<y2—inclination of the spinning rotor 1 to the left occurred Preferably, the sensors A, B are high frequency transformers composed of a pair of coils arranged on the opposite areas of a printed circuit board or on the inner areas of a multilayer printed circuit. Furthermore, it is advantageous if the sensors A are located near the edge of a through-hole in the printed circuit board and the spinning rotor 1 passes through this hole in the printed circuit board, so that the sensors A are located against the cylindrical wall 10 of the spinning rotor 1, whereby the diameter of the through-hole in the printed circuit board is only slightly greater, typically e.g. by 2 mm, than is the outer diameter of the spinning rotor 1, as is all illustrated in FIG. 1. Preferably, the sensors B are positioned on a separate printed circuit board situated approximately 1 mm below or above the level of the lower or the upper monitored wall 11 of the spinning rotor 1, which is perpendicular to the rotation axis OA of the spinning rotor 1, or the sensors B are located in the embodiment according to FIG. 1 near the edge of a through-hole in the printed circuit board, whereby this through-hole has a smaller diameter than is the outer diameter of the spinning rotor 1, so that the sensors B can be arranged directly against the wall 11 of the spinning rotor 1, which is perpendicular to the rotation axis OA of the spinning rotor 1.

The above-mentioned arrangement of all the essential elements always on printed circuit boards, or, as the case may be, on a common printed circuit board, eliminates, or at least substantially decreases an occurrence of induced disturbing signals, thus increasing the sensitivity of the sensors A, B made as high frequency transformers with a pair of coils. In addition, this embodiment of the sensors A, B also allows easy installation directly to the spinning unit of an open-end spinning machine with a possibility of high integration, since on the printed circuit boards with the sensors A, B it is possible to integrate virtually the complete electronics of the active magnetic bearing or it is simply possible to interconnect these boards and the electronics of the active magnetic bearing. In this manner production costs can be considerably reduced.

Figure 4:
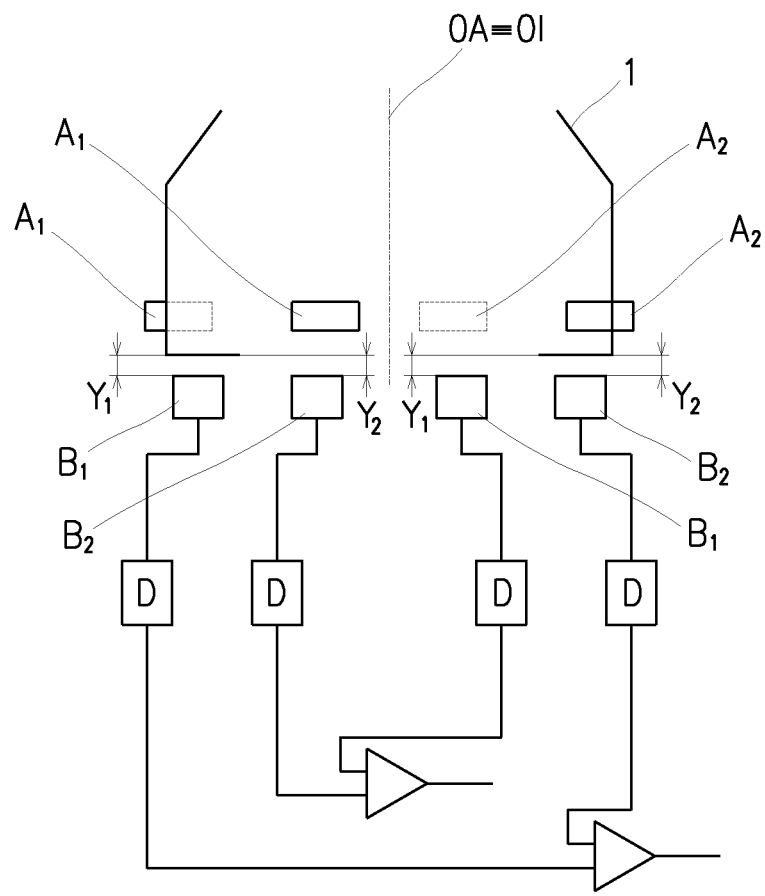

The sensors A, B, made as high frequency transformers with pairs of coils on a printed circuit board, are at the input excited by a high frequency exciting signal having a frequency in the order of a minimum of tens of MHz, typically in the frequency range from tens of MHz to hundreds of MHz, especially in the frequency range from 20 MHz and more. The output signal of these sensors A, B is processed by detectors D connected, as is shown in FIGS. 3 and 4, whereby the output signals of the detectors D are further used in the evaluation circuits and the control system of the active magnetic bearing. The control system of the active magnetic bearing can be made either in the active magnetic bearing, or it can be composed of the means of the spinning unit, or it can be made up of the means of the operating unit or the machine or of means of the whole machine, etc., or it can be basically a distributed control system.

What is claimed is:

1. A method for detecting changes of position of a shaftless spinning rotor of an open-end spinning machine in a cavity of an active magnetic bearing, in which the position of the spinning rotor is detected by a system of sensors and based on detected changes in the position of the spinning rotor, controlling of the active magnetic bearing is adjusted in order to eliminate undesirable changes in the position of the spinning rotor in the cavity of the active magnetic bearing,
   wherein radial shifting of the spinning rotor and simultaneously inclination of the spinning rotor are continuously detected,
   according to the detected changes in the position of the spinning rotor is determined shifting and/or inclination of the spinning rotor which is used for subsequent adjustment of the controlling of position of the spinning rotor in the active magnetic bearing both radial shifting and inclination of the spinning rotor are each detected by at least two pairs of sensors of the distance of monitored surface of the spinning rotor,
   wherein two pairs of interconnected sensors for detecting radial shifting of the spinning rotor detect changes of distances of a cylindrical outer wall of the spinning rotor from the sensors, and wherein another two pairs of interconnected sensors for detecting inclination of the spinning rotor detect a change of the distances of an annular top wall of the spinning rotor, which is perpendicular to the rotation axis of the spinning rotor, from the sensors arranged against said annular top wall.

2. The method according to claim 1, wherein the spinning rotor has open top and bottom ends, and that a length of the spinning rotor approximates a diameter of the spinning rotor.

3. The method according to claim 1, wherein the sensors are high frequency transformers each comprising a pair of coils on a printed circuit board.

4. The method according to claim 3, wherein said sensors are excited in a frequency range of at least 20 MHz.

5. A spinning unit of an open-end spinning machine with an active magnetic bearing for bearing a shaftless spinning rotor which comprises means for creating and controlling of a magnetic field, in which the spinning rotor is arranged,
   wherein the bearing further comprises sensors of the position of the spinning rotor, the sensors are coupled with detectors of their output signals and are coupled with evaluation circuits, and the evaluation circuits are connected to the control system of the active magnetic bearing,
   wherein the sensors of the position of the spinning rotor are grouped into pairs,
   wherein two pairs of interconnected sensors for detecting radial shifting of the spinning rotor are arranged on opposite sides of a spinning rotor against the cylindrical outer wall of the spinning rotor, and
   wherein another two pairs of interconnected sensors for detecting inclination of the spinning rotor are arranged on the opposite sides of the spinning rotor against an annular top wall of the spinning rotor, which is perpendicular to the rotation axis of the spinning rotor.

6. The spinning unit according to claim 5, characterized in that the two pairs of sensors for detecting of radial shifting of the spinning rotor are situated in two directions perpendicular to each other and the other two pairs of sensors for detecting of inclination of the spinning rotor are situated in two directions perpendicular to each other, which form angles of 45° with the directions of the placement of the sensors for detecting of radial shifting of the spinning rotor.

7. The spinning unit according to claim 5, wherein the spinning rotor has open top and bottom ends, and a length of the spinning rotor approximates a diameter of the spinning rotor.

8. The spinning unit according to claim 5, wherein the sensors are high frequency transformers each comprising a pair of coils on a printed circuit board.

9. The spinning unit according to claim 8, wherein said sensors are excited in a frequency range of at least 20 MHz.

* * * * *